United States Patent
Guo et al.

(10) Patent No.: US 9,246,651 B2
(45) Date of Patent: Jan. 26, 2016

(54) OUTER-LOOP CONTROL IN WIRELESS COMMUNICATION LINK ADAPTATION

(71) Applicant: Telefonaktiebolaget L M Ericsson (Publ), Stockholm (SE)

(72) Inventors: Shiguang Guo, Kanata (CA); Guoqiang Lu, Kanata (CA); Xixian Chen, Ottawa (CA); Ping Yu, Ottawa (CA); Hong Ren, Kanata (CA); Ahmed Nouah, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 98 days.

(21) Appl. No.: 14/106,191

(22) Filed: Dec. 13, 2013

(65) Prior Publication Data

US 2015/0172022 A1 Jun. 18, 2015

(51) Int. Cl.
*H04W 72/08* (2009.01)
*H04L 5/00* (2006.01)
*H04W 52/04* (2009.01)
*H04L 1/20* (2006.01)
*H04L 1/00* (2006.01)

(52) U.S. Cl.
CPC ............ *H04L 5/0053* (2013.01); *H04L 1/0001* (2013.01); *H04L 1/203* (2013.01); *H04W 52/04* (2013.01)

(58) Field of Classification Search
CPC .................................................... H04W 72/085
See application file for complete search history.

(56) References Cited

U.S. PATENT DOCUMENTS

2008/0159192 A1 7/2008 Lee et al.
2010/0105390 A1* 4/2010 Ishii .............................. 455/436
(Continued)

FOREIGN PATENT DOCUMENTS

WO 2010112085 A1 10/2010

OTHER PUBLICATIONS

International Search Report and Written Opinion dated Apr. 13, 2015 for corresponding International Application No. PCT/IB2014/065046; International Filing Date: Oct. 3, 1024 consisting of 17-pages.

(Continued)

*Primary Examiner* — Brandon Renner
(74) *Attorney, Agent, or Firm* — Christopher & Weisberg, P.A.

(57) ABSTRACT

A method and base station for outerloop adjustment for link adaptation of a physical downlink control channel, PDCCH, in a communication network to determine a control channel element, CCE, aggregation level of a downlink assignment downlink control information, DCI, and a CCE aggregation level of an uplink grant DCI is provided. A downlink data packet feedback corresponding to the downlink assignment is received. A status of the downlink data packet feedback is determined. An uplink data packet corresponding to the uplink grant is received and a status thereof is determined. An outerloop downlink adjustment and outerloop uplink adjustment are updated based on at least one of the status of the downlink data packet feedback corresponding to the downlink assignment and status of the uplink data packet corresponding to the uplink grant. An outerloop uplink adjustment is determined as a sum of the outerloop downlink adjustment and an offset adjustment.

24 Claims, 8 Drawing Sheets

(56) References Cited

U.S. PATENT DOCUMENTS

| | | | | |
|---|---|---|---|---|
| 2011/0250919 | A1* | 10/2011 | Barbieri et al. | 455/509 |
| 2012/0039170 | A1* | 2/2012 | Ball et al. | 370/230 |
| 2012/0287813 | A1* | 11/2012 | Alm et al. | 370/252 |
| 2013/0182569 | A1* | 7/2013 | Bertrand et al. | 370/232 |
| 2013/0301542 | A1* | 11/2013 | Krishnamurthy et al. | 370/329 |
| 2013/0322276 | A1* | 12/2013 | Pelletier et al. | 370/252 |
| 2014/0003260 | A1* | 1/2014 | Tabet et al. | 370/252 |
| 2014/0153488 | A1* | 6/2014 | Koivisto et al. | 370/328 |
| 2014/0369283 | A1* | 12/2014 | Ge et al. | 370/329 |
| 2015/0036602 | A1* | 2/2015 | Wang et al. | 370/329 |
| 2015/0049703 | A1* | 2/2015 | Nobukiyo et al. | 370/329 |

OTHER PUBLICATIONS

Kovacs Istvan Z. et al.: "Effects of Non-Ideal Channel Feedback on Dual-Stream MIMO-OFDMA System Performance", 2007 Vehicular Technology Conference, held in Baltimore, MD, VTC-2007 Fall, 2007 IEEE 66th pp. 1852-1856; XP031147728, ISBN: 978-1-4244-0263-2 Section II, Sep. 1, 2007 consisting of 6-pages.

Song Pengpeng et al.: "Performance Evaluation on Dynamic Dual Layer Beamforming Transmission in TDD LTE System", 2013 3rd International Conference on Communications and Information Technology (ICCIT), held in Beirut, Lebanon, IEEE, pp. 269-274, XP032476859, DOI: 10.1109/ICCITECHNOLOGY.2013.6579562, ISBN: 978-1-4673-5306-9, Jun. 19, 2013 consisting of 6-pages.

Cavalcante Andre M. et al., "System-Level Analysis of Outer Loop Link Adaptation on Mobile WiMAX Systems", International Telecommunications Symposium (ITS 2010), held in Manaus, Brazil, XP055157222, Jan. 1, 2010 consisting of 6-pages.

PCT Invitation to Pay Additional Fees, Form PCT/ISA/206, dated Jan. 5, 2015 for corresponding International Application No. PCT/IB2014/065046; International Filing Date: Oct. 3, 2014 consisting of 8-pages.

3GPP TS 36.212 V9.2.0 (Jun. 2010); 3rd Generation Partnership Project; Technical Specification Group Radio Access Network; Evolved Universal Terrestrial Radio Access (E-UTRA); Multiplexing and channel coding (Release 9) consisting of 61-pages.

3GPP TS 36.211 V10.3.0 (Sep. 2011); 3rd Generation Partnership Project; Technical Specification Group Radio Access Network; Evolved Universal Terrestrial Radio Access (E-UTRA); Physical Channels and Modulation (Release 10) consisting of 103-pages.

3GPP TS 36.213 V10.3.0 (Sep. 2011); 3rd Generation Partnership Project; Technical Specification Group Radio Access Network; Evolved Universal Terrestrial Radio Access (E-UTRA); Physical layer procedures (Release 10) consisting of 122-pages.

* cited by examiner

OUTER-LOOP CONTROL IN WIRELESS COMMUNICATION LINK ADAPTATION

TECHNICAL FIELD

The present invention relates to wireless communication, and in particular, to methods and devices for outer-loop adjustment for wireless communication link adaptation.

BACKGROUND

The demand on wireless data services has grown exponentially over the last ten years, driven particularly by the popularity of smart phones. To meet this growing demand, new generations of wireless standards with both multiple input and multiple output (MIMO) and orthogonal frequency division multiple access (OFDMA), and/or single carrier FMDA (SC-FDMA) technologies have been developed, such as 3rd Generation Partnership Program (3GPP) Long Term Evolution (LTE) and Word Interoperability for Microwave Access (WIMAX). One key area is the ever growing capacity demand of the network based on these standards. One of the challenges in supporting capacity growth is the optimal usages of the limited radio resources shared by User Equipments (UEs), such as Physical Downlink Control Channel (PDCCH) usage.

Downlink Control Information (DCI) carries scheduling information for both uplink and downlink data traffic. Uplink data traffic includes data sent from a UE to a base station. Downlink data traffic includes data being sent from a base station to a UE. DCI provides a UE with the necessary information for proper reception and decoding of the downlink data transmission. There are four different DCI formats. DCI formats 0 and 3 are for uplink data transmissions and DCI formats 1 and 2 are for downlink data transmission. A DCI carrying downlink scheduling information is called a DL assignment and a DCI carrying uplink scheduling information is called a UL grant. As used herein, DL assignment may be referred to as DL assignment DCI or DL DCI. UL grant may be referred to herein as UL grant DCI or UL DCI. One UE can have one or more DCIs in a same Transmission Time Interval (TTI).

Each DCI is carried on one or multiple Control Channel Elements (CCEs) depending on the DCI length and the channel condition. The number of CCEs used, which is referred to as the CCE aggregation level, can be 1, 2, 4 or 8. All CCEs for the same DCI carry the same information. In case of multiple CCEs, i.e., higher aggregation level, the DCI payload is repeated to achieve a lower code rate, which may be needed if the UE is experiencing poor radio conditions. Each CCE consists of 9 Resource Element Groups (REG). Each REG includes 4 (or 6 in the case of a Reference Symbol) consecutive Resource Elements (RE) in the frequency domain.

A DCI is mapped to a PDCCH at the physical layer (PHY). DCIs from multiple UEs are multiplexed together in the control symbol region, which are the first few OFDMA symbols, in a TTI. The payload of the DCI is rated, matched and scrambled with a cell-specific and a slot-specific scrambling sequence. Multiple REGs from the same CCE are interleaved and cyclic shifted (CS) among different frequency and time domains to achieve good frequency and time diversity. PDCCH occupies the first 1 to 3 or 4 symbols in each TTI depending on the bandwidth.

PDCCH link adaptation (LA) is used to choose the optimal CCE aggregation level for each DCI based on radio channel conditions, i.e., channel state information, which is measured and reported to the eNodeB (eNB) as Channel Quality Indicator (CQI) by a UE. If the channel condition is good, i.e., a higher CQI, then a fewer number of CCEs or a lower CCE aggregation level may be used. If the channel condition is poor, i.e., a lower CQI, then a greater number of CCEs or a higher aggregation level will be used.

Since a maximum of 3 control symbols are used when the bandwidth is larger than 1.4 MHz (a maximum of 4 symbols in a case of 1.4 MHz), the number of available CCEs for each TTI is limited. These limited control symbols are shared by all the UEs. Therefore, the performance of PDCCH LA will greatly impact the performance of LTE Radio Access Network (RAN), such as capacity. As an example, in case of Voice over IP (VoIP), PDCCH capacity will be the key limiting factor for VoIP capacity as the demand of DCI is very high. If the PDCCH LA is too aggressive, i.e., uses less CCEs for the UE to accommodate capacity, some UEs will have more PDCCH decode failure. Then the UE cannot even locate the related DL data sent through PDSCH or UL data granted at PUSCH. This will result in significant throughput reduction and/or reduced user satisfaction level. If the PDCCH LA is too conservative, fewer numbers of users can be accommodated by the PDCCH resources, resulting in lower capacity.

According to conventional implementations, PDCCH link adaptation uses wideband CQI reports from a UE to derive wideband PDCCH Signal to Interference plus Noise Ratio (SINR). This wideband CQI is measured by the UE and reported to the eNB through uplink channels such as a Physical Uplink Shared Channel (PUSCH) or a Physical Uplink Control Channel (PUCCH). Accurate and timely reporting of the CQI by the UE helps the eNB select the optimal CCE aggregation level. This is not always the case as CQI reporting intervals are limited by signaling overhead and the accuracy may vary from UE to UE depending on UE specific implementation.

To accommodate systematic errors in CQI reporting from the UE and to track faster changes in channel conditions, a PDCCH outer-loop adjustment is normally used to generate an outer-loop adjustment, OL_ADJ, which is added to the PDCCH SINR estimation based on the CQI report. The overall estimated SINR based on the CQI report and the outer-loop adjustment is used in determining the CCE aggregation level. The outer-loop adjustment is calculated based on the PDCCH transmission result which is determined by eNB. The transmission result could be success, failure, or unknown. When the eNB cannot determine whether a PDCCH transmission is successful or not, it is referred to as "unknown" status. The outer-loop adjustment of PDCCH SINR based on different PDCCH transmission results can be calculated as follows:

If the previous transmission is a success, SINR is increased by an amount defined as UP_STEP such that the SINR adjustment is calculated as:

$$OL\_ADJ \mathrel{+}= UP\_STEP. \quad (Eq.\ 1)$$

If the previous transmission is a failure, SINR is decreased by an amount defined as DOWN_STEP, such that the SINR adjustment is calculated as:

$$OL\_ADJ \mathrel{-}= DOWN\_STEP. \quad (Eq.\ 2)$$

If the eNB is unable to determine whether the previous transmission is successful or not, i.e., "unknown," the SINR is decreased by a fraction of DOWN_STEP, i.e., factored by a, such that the SINR adjustment is calculated as:

$$OL\_ADJ \mathrel{-}= \alpha * DOWN\_STEP. \quad (Eq.\ 3)$$

The ratio of the UP_STEP and DOWN_STEP is determined based on the desired, or target Block Error Rate (BLER) percentage, i.e., the PDCCH transmission failure rate:

$$DOWN\_STEP/UP\_STEP = 100/BLER\_TARGET - 1. \quad (Eq.\ 4)$$

The DOWN_STEP value may be tuned to have the desired outer-loop convergence speed. The adjustment parameter a may be a tuning parameter with a value between 0 and 1. BLER_TARGET may be a predetermined value.

In the conventional PDCCH link adaptation implementation, there is one outer-loop for both DL assignments DCIs and UL grants DCIs. A single performance target in terms of PDCCH BLER applies to both DL assignment DCIs and UL grant DCIs. One outer-loop adjustment is generated and used to determine the CCE aggregation level together with PDCCH SINR. This implies: (1) that the achieved BLER of the PDCCH will be the average BLER of DL DCIs and UL DCIs. The resulting BLER for a UE's DL DCI and UL DCI may be different, but it is not possible to achieve a different BLER for DL DCIs and UL DCIs in a controlled fashion with the current, one shared single outer-loop. This also implies: (2) that the aggregation levels will be the same for DL DCIs and UL DCIs that are of the same bit length despite the possible different channel conditions that each DCI may experience. This is due to the fact that the same SINR (same CQI and same outer-loop adjustment) will be applied when selecting the CCE aggregation level There may be situations where different PDCCH BLER targets for UL and DL DCIs may be desired. Specifically, a lower BLER may be desired for UL DCIs than for DL DCIs in several scenarios. It is may also be desirable that when DL DCI and UL DCI experience different channel conditions, which may happen due to non-perfect interleaving of the PDCCH REs and/or different interference levels, the outer-loop algorithm should be able to generate different adjustments accordingly. None of these is possible with the conventional PDCCH LA and outer-loop control.

Scenario 1

In a first scenario, it is possible that both DL and UL scheduler schedules a UL grant and a DL assignment DCIs in a same TTI. In such a case, the eNB expects that the UE sends the PDSCH acknowledgement or not-acknowledgement (ACK/NACK) corresponding to the DL assignment through the PUSCH in the same TTI that is scheduled for the UL grant.

In a case of an aggressive PDCCH DCI aggregation level when the PDCCH link adaptation and outer-loop is applied, the detection of DCI for UL grant at the UE could fail while the detection of DCI for DL assignment and detection of PDSCH could succeed or vice-versa. This may be due to certain unavoidable error rate on PDCCH transmission and a relatively slow convergence of outer-loop adjustment. In such a case, losing the UL grant impacts uplink throughput and also negatively impacts downlink throughput.

The performance differences between UL grant and DL assignment could be due to multiple reasons. One reason is that a code rate discrepancy due to the numerical error occurred during conversion from the estimated PDCCH Signal to Interference plus Noise Ratio (SINR) to the number of CCEs in each DCI. During the conversion, payload size is applied to ensure that the code rate for both DL assignment and UL grant are normalized to be the same. Initially, SINR is converted to system information (SI). SI is then converted to resource element information block (RBIR). Finally, RBIR is converted to the number of CCEs. The number of CCEs can be a decimal number, i.e., one of the following four values: 1, 2, 4, or 8. Thus, 1 CCE is assigned even if the required number is much less than 1, or only 8 CCEs are assigned when the required number of CCEs is greater than 8.

As described above, since multiple look-up tables are used and interpolations as well as rounding operations are applied to get the number of CCEs, it is likely that the code rate varies from DCI to DCI. For example, assuming DL assignment and UL grant have similar estimated SINR, with DL assignment being slightly higher, then after conversion, due to interpolation and rounding errors, DCI for DL assignment could use a CCE aggregation level 4 while DCI for UL grant could use CCE aggregation level 2.

Another reason for performance differences between UL grant and DL assignment could be due to different interference levels between UL and DL DCI. This could happen, for example, to UEs at the cell edge where Common Reference Signal (CRS) interferences from neighboring cells are strong. In shifted CRS deployment, the interference from neighboring cells will affect certain CCEs more than others. For example, if range extenders (REs) are used relatively more for UL DCI data than for DL DCI data, the decoding performance for the UL DCI data will suffer more than that of the DL DCI data.

Since the eNB expects PUSCH to carry the ACK/NACK and the UE did not send PUSCH due to the loss of the UL grant, the eNB is unsure if the PDSCH is successful or not. The eNB would then have to retransmit the previous payload, which is unnecessary. Moreover, since PDCCH OL may not converge within a few TTIs, UL grant could be lost again in the retransmission. Repeated re-transmissions impact the downlink Hybrid Automatic Repeat Request (HARQ) operation significantly and introduce many unnecessary retransmissions, resulting in reduced downlink throughput.

To solve the above described issue, the eNB can be configured to detect HARQ ACK/NACK from the same UE from both PUCCH and PUSCH even though the eNB is expecting HARQ ACK/NACK from PUSCH only. This will prevent eNB from losing the detection of HARQ ACK/NACK in PUCCH and avoid unnecessary retransmissions. The eNB will perform HARQ ACK/NACK detection from both PUSCH and PUCCH and decide which value to use. However, this solution has several drawbacks. First, extra CPU cycles will be consumed to perform ACK/NACK detection on both PUCCH and PUSCH for the same UE, which will significantly impact capacity as well as latency. Second, extra configuration signaling between media access control (MAC) and PHY is required. Third, an additional algorithm is required to reliably determine which ACK/NACK detection result from PUCCH and PUSCH will be used.

Scenario 2

In carrier aggregation (CA), multiple downlink component carriers are used and more HARQ ACK/NACKs are needed to be reported through uplink channel on primary component carrier only. So, if one UL DCI fails, multiple downlink component carriers will be affected. Therefore, it is desired to have relatively better performance in UL grant DCI compared to DL assignment DCI.

In the case of time division duplex (TDD) communication, there may be more DL TTIs that have DL assignments to this UE and the bundled and/or multiplexed HARQ ACK/NACKs are sent through PUSCH. So, if the UL grant DCI is lost, PDSCH in multiple TTIs will be impacted. Therefore, similar to CA, in TDD it is desirable to have relatively better performance in UL grant DCI compared to that in DL assignment DCI.

In both scenarios 1 and 2 above, it is desirable to be able to control the BLER targets for DL assignment and UL grant differently. Specifically, UL grant should have a lower BLER target as its impact is deemed relatively higher than DL assignment. To be able to optimally use the limited PDCCH resources when DL DCIs and UL DCIs may experience different interference levels, different CCE aggregation levels are desired for DL DCIs and UL DCIs. And since the interference levels are instantaneously changing over time, tracking the interference levels by the eNB's perception on PDCCH is difficult and tends to be slow, it is desirable to have an additional margin to ensure good performance on uplink grant.

SUMMARY

The present invention relates to an outer loop adjustment for link adaptation of a physical downlink control channel, PDCCH, in a communication network to determine a control channel element, CCE, aggregation level of a downlink assignment downlink control information, DCI, and a CCE aggregation level of an uplink grant DCI. In accordance with one embodiment of the present invention, a method of outer loop adjustment for link adaptation of a PDCCH in a communication network to determine a CCE aggregation level of a downlink assignment and a CCE aggregation level of an uplink grant includes receiving a downlink data packet feedback corresponding to the downlink assignment. A status of the downlink data packet feedback is determined. An uplink data packet corresponding to the uplink grant is received. A status of the uplink data packet is determined. An outer loop downlink adjustment is updated based on at least one of the status of the downlink data packet feedback corresponding to the downlink assignment and the status of the uplink data packet corresponding to the uplink grant. An outer loop uplink adjustment is determined to be a sum of the outer loop downlink adjustment and an offset adjustment. The outer loop downlink adjustment and the outer loop uplink adjustment affect the outer loop adjustment for link adaptation of the PDCCH.

In accordance with an aspect of this embodiment, a number of consecutive transmission time intervals, TTIs, that include DCIs corresponding to the uplink grant is tallied. If the number of consecutive TTIs exceeds a predetermined threshold, the outer loop downlink adjustment is updated by an uplink adjustment step based on the status of the uplink data packet corresponding to the uplink grant. In accordance with another aspect of this embodiment, if the DCI corresponds to the downlink assignment, the outer loop downlink adjustment is updated by a downlink adjustment step. If the DCI corresponds to the uplink grant, the outer loop downlink adjustment is updated by an uplink adjustment step.

In accordance with yet another aspect of this embodiment, the downlink adjustment step is one of an up-step of the downlink adjustment step and a down-step of the downlink adjustment step. The uplink adjustment step is one of an up-step of the uplink adjustment step and a down-step of the uplink adjustment step. In accordance with yet another aspect of this embodiment, the status of the feedback corresponding to the downlink assignment is determined by a base station. If the status of the feedback corresponding to the downlink assignment is unknown, the down-step of the downlink adjustment step is factored by an adjustment parameter. The factored down-step of the downlink adjustment step is used to update the outer loop downlink adjustment.

In accordance with an aspect of this embodiment, updating the outer loop downlink adjustment by the uplink adjustment step includes factoring the uplink adjustment step by a confidence parameter. In accordance with another aspect of this embodiment, if the status of the uplink data packet corresponding to the uplink grant is unknown, a down-step of the uplink adjustment step is factored by an adjustment parameter. The factored down-step of the uplink adjustment is used to update the outer loop downlink adjustment.

In accordance with yet another aspect of this embodiment, a channel state information, CSI, report is received from a user equipment, UE, to determine a signal to interference plus noise ratio, SINR, based on the CSI report. The CCE aggregation level of the downlink assignment is determined based on a sum of the determined SINR and the outer loop downlink adjustment. The CCE aggregation level of the uplink grant is determined based on a sum of the determined SINR and the outer loop uplink adjustment.

In accordance with another embodiment, a method of dual outer loop adjustment has a first outer loop adjustment and a second outer loop adjustment for link adaptation of a control channel in a wireless communication network. The method includes receiving a feedback corresponding to a downlink assignment downlink control information, DCI and receiving an uplink data packet corresponding to an uplink grant DCI. The first outer loop adjustment of a downlink adjustment is executed to affect a first of the dual outer loop adjustment for link adaptation. The second outer loop adjustment of an uplink adjustment is executed to affect a second of the dual outer loop adjustment for link adaptation.

In accordance with an aspect of this embodiment, a channel state information, CSI, report is received from a user equipment, UE. A signal to interference plus noise ratio, SINR, is determined based on the CSI report. A control channel element, CCE, aggregation level for the downlink assignment on the physical downlink control channel, PDCCH, is determined based on a sum of the determined SINR and the downlink adjustment. A CCE aggregation level for an uplink grant on the PDCCH is determined based on a sum of the determined SINR and the updated uplink adjustment. Executing the first outer loop adjustment of the downlink adjustment includes updating the downlink adjustment, based on the status of the feedback corresponding to the downlink assignment, by a downlink adjustment step. Executing the second outer loop adjustment of the uplink adjustment includes updating the uplink adjustment, based on the status of the uplink data packet corresponding to the uplink grant, by an uplink adjustment step.

In accordance with another aspect of this embodiment, the status of the feedback corresponding to the downlink assignment DCI is determined by a base station. Executing the first outer loop adjustment of the outer loop downlink adjustment further includes factoring a down step of the downlink adjustment step by an adjustment parameter if the DCI corresponds to the downlink assignment and the status of the corresponding feedback is unknown. The factored down step of the downlink adjustment step is used to update the downlink adjustment. The status of the uplink data packet corresponding to the uplink grant is determined by the base station. Executing the second outer loop adjustment of the uplink adjustment further includes factoring a down step of the uplink adjustment step by the adjustment parameter if the DCI corresponds to the uplink grant and the status of the corresponding uplink data packet is unknown. The factored up step of the uplink adjustment step is used to update the uplink adjustment.

In accordance with yet another aspect of this embodiment, executing the first outer loop adjustment of the downlink adjustment further includes tallying a first number of consecutive DCI transmissions that correspond to the uplink grant. If the first number exceeds a first predetermined threshold, whether the DCI transmission corresponds to the uplink grant is determined. If the DCI transmission corresponds to the uplink grant, the uplink adjustment step is factored by a confidence parameter. The factored uplink adjustment step is used to update the downlink adjustment. In accordance with still another aspect of this embodiment, executing the second outer loop adjustment of the uplink adjustment further includes tallying a second number of consecutive DCI transmissions that correspond to the downlink assignment. If the second number exceeds a second predetermined threshold, whether the DCI transmission corresponds to the downlink assignment is determined. The second predetermined threshold is different than the first predetermined threshold. If the DCI transmission corresponds to the downlink assignment the downlink adjustment step is factored by the confidence parameter. The factored downlink adjustment step is used to update the uplink adjustment.

In accordance with an aspect of this embodiment, executing the first outer loop adjustment of the downlink adjustment further includes factoring the uplink adjustment step by a confidence parameter if the DCI transmission corresponds to the uplink grant. The factored uplink adjustment step is used to update the downlink adjustment. Executing the second outer loop adjustment of the uplink adjustment further includes factoring the downlink adjustment step by the confidence parameter if the DCI transmission corresponds to the downlink assignment. The factored downlink adjustment step is used to update the uplink adjustment.

In accordance with another aspect of this embodiment, executing the first outer loop adjustment of the downlink adjustment further includes factoring a down step of the uplink adjustment step by the adjustment parameter and by the confidence parameter if the DCI transmission corresponds to the uplink grant and the status of the corresponding uplink data packet is unknown. The factored down step of the uplink adjustment step is used to update the downlink adjustment. Executing the second outer loop adjustment of the uplink adjustment further includes factoring a down step of the downlink adjustment step by the adjustment parameter and the confidence parameter if the DCI transmission corresponds to the downlink assignment and the status of the corresponding feedback is unknown. The factored down step of the downlink adjustment step is used to update the uplink adjustment.

In accordance with another embodiment, a method of outer loop adjustment for link adaptation of a physical downlink control channel, PDCCH, in a wireless communication network, includes determining a number of downlink data packet feedbacks corresponding to downlink assignments to be received on a physical uplink shared channel, PUSCH, in a same transmission time interval, TTI, as an uplink data packet corresponding to an uplink grant from a user equipment, UE. An additional transmission power for the uplink grant is determined based on the number of downlink data packet feedback corresponding to downlink assignments to be transmitted with the corresponding uplink data packet in the same TTI. The uplink data packet corresponding to the uplink grant is received. A status of the uplink data packet is determined. A feedback corresponding to a downlink assignment is received. A status of the feedback is determined. An outer loop adjustment is updated based on the status of the feedback corresponding to the downlink assignment and the status of the uplink data packet corresponding to the uplink grant to affect outer loop adjustment.

In accordance with an aspect of this embodiment, if the status of the feedback corresponding to the downlink assignment is success, the outer loop adjustment is updated by an up step. If the status of the uplink data packet corresponding to the uplink grant is success, a number of the downlink data packet feedbacks corresponding to downlink assignments transmitted on the PUSCH in the same TTI as the uplink data packet is determined. The up step of the outer loop adjustment is factored by an adjustment parameter based on the number of the feedback messages transmitted on the PUSCH in the same TTI. The outer loop adjustment is updated by the factored up step.

In accordance with another aspect of this embodiment, if the status of the downlink data packet feedback corresponding to the downlink assignment is unknown, a down step of the outer loop adjustment is factored by a confidence factor. The outer loop adjustment is updated by the factored down step. In accordance with yet another aspect of this embodiment, if the status of the uplink data packet corresponding to the uplink grant is unknown, a number of downlink data packet feedback messages transmitted on the PUSCH in the same TTI as the uplink data packet from the UE is determined. A down step of the outer loop adjustment is factored by an inverse of an adjustment parameter and a confidence factor that depends on the number of downlink data packet feedbacks transmitted on the PUSCH in the same TTI. The outer loop adjustment is updated by the factored down step.

In accordance with still another aspect of this embodiment, the additional transmission power is added to each control element of an uplink grant based on the number of the downlink data packet feedbacks corresponding to downlink assignments to be transmitted on the PUSCH in the same TTI as the corresponding uplink data packet.

In accordance with another embodiment, a base station is for communicating with a mobile device for outer loop adjustment for link adaptation of a physical downlink control channel, PDCCH, in a communication network to determine a control channel element, CCE, aggregation level of a downlink assignment downlink control information, DCI, and a CCE aggregation level of an uplink grant DCI. The base station includes a receiver configured to receive a downlink data packet feedback corresponding to the downlink assignment and an uplink data packet corresponding to the uplink grant from the mobile device. The receiver is in communication with a processor configured to determine a status of each of the downlink data packet feedback corresponding to the downlink assignment and the uplink data packet corresponding to the uplink grant. An outer loop downlink adjustment is updated based on at least one of the status of the downlink data packet feedback corresponding to the downlink assignment and the status of the uplink data packet corresponding to the uplink grant. An outer loop uplink adjustment is determined as a sum of the outer loop downlink adjustment and an offset adjustment. The outer loop downlink adjustment and the outer loop uplink adjustment affect the outer loop adjustment for link adaptation of the PDCCH.

In accordance with an aspect of this embodiment, the processor is further configured to update the outer loop downlink adjustment by a downlink adjustment step if the DCI transmission corresponds to the downlink assignment. If the DCI transmission corresponds to the uplink grant, the outer loop downlink adjustment is updated by an uplink adjustment step. In accordance with another aspect of this embodiment, the processor is further configured to factor the down-step of the downlink adjustment step by an adjustment parameter if the status of the downlink data packet feedback corresponding to the downlink assignment is unknown. The factored down-step of the downlink adjustment step is used to update the outer loop downlink adjustment.

In accordance with yet another aspect of this embodiment, the receiver is further configured to receive a channel state information, CSI, reported from a user equipment, UE. The processor is further configured to determine a signal to interference plus noise ratio, SINR, based on the CSI report. The CCE aggregation level of the downlink assignment is determined based on a sum of the determined SINR and the outer loop downlink adjustment. The CCE aggregation level of the uplink grant is determined based on a sum of the determined SINR and the outer loop uplink adjustment.

DETAILED DESCRIPTION

As used herein, relational terms, such as "first" and "second," "top" and "bottom," and the like, may be used solely to distinguish one entity or element from another entity or element without necessarily requiring or implying any physical or logical relationship or order between such entities or elements.

In embodiments described herein, the joining term, "in communication with" and "connected to," and the like, may be used to indicate electrical or data communication, which may be accomplished by physical contact, induction, electromagnetic radiation, radio signaling, infrared signaling or optical signaling, for example. The above methods of achieving electrical or data communication are non-limiting and mentioned only for illustration. One having ordinary skill in the art will appreciate that multiple components may interoperate and modifications and variations are possible of achieving the electrical and data communication.

Figure 1:
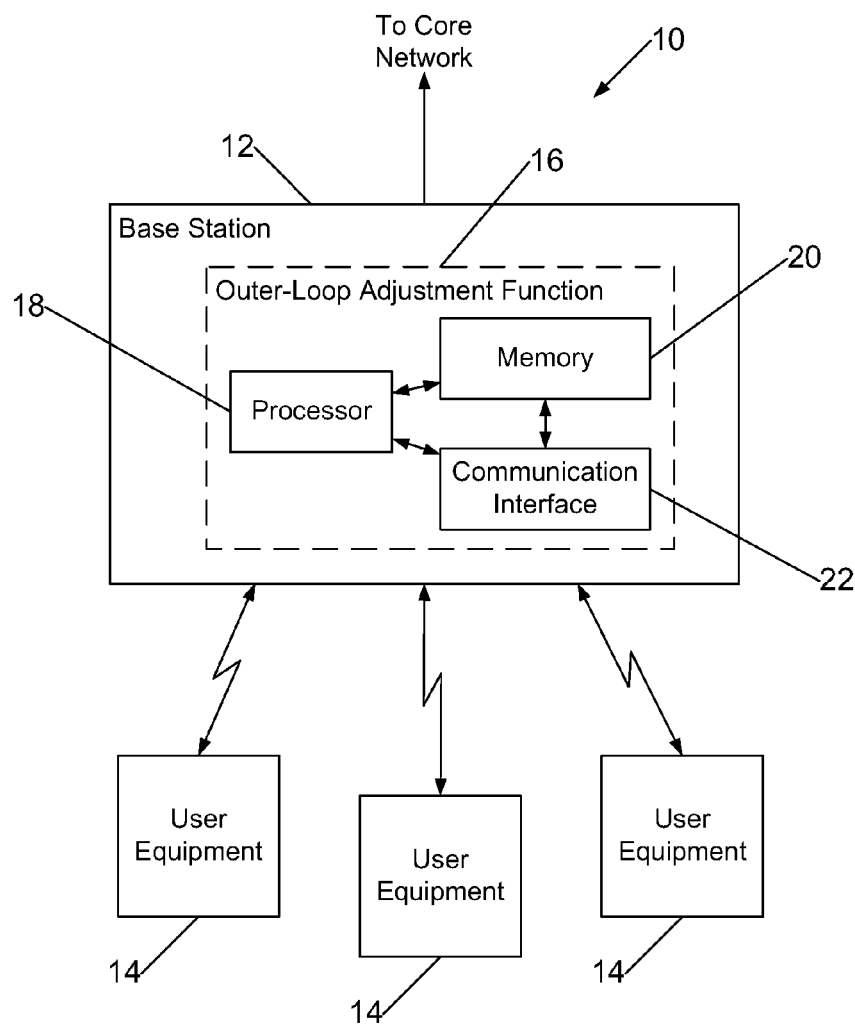
FIG. 1 is a block diagram of a communications system constructed in accordance with principles of the present invention.

Referring to the drawing figures in which like reference designators refer to like elements, FIG. 1 shows a block diagram of a communication system 10 according to an exemplary embodiment of the present invention. In one embodiment, communication system 10 is a Long Term Evolution (LTE) network. The invention is not limited to such. It is contemplated that other networking technologies, such as other network types compliant with 3rd Generation Partnership Project (3GPP) specifications can be implemented as communication system 10. The communication system 10 includes a base station 12 in communication with one or more user equipments (UE) 14. The base station 12 may be part of a Radio Access Network (RAN) (not pictured) that is in communication with a Core Network (CN) (not pictured) and may be, for example, an Evolved Node B (eNodeB), which may be in communication with a core network in an LTE network. The base station provides the air interface for the UE 14 and communicatively couples the UE to a CN, for example. The base station 12 includes an outer-loop adjustment module 16 for controlling adaptation of the wireless communication link between the base station 12 and the UE 14.

The outer-loop adjustment module 16 may be implemented, for example, in hardware on a processor 18 or as a combination of hardware and software. Programmatic code to implement aspects of the outer-loop adjustment module 16, including the functions of the processor 18 can be stored in a memory 20. The memory 20 may be any volatile or non-volatile storage device capable of storing data including, for example, solid-state memory, optical storage and magnetic storage. The outer-loop adjustment module 16 may utilize a communication interface 22 to determine characteristics of the communication link, such as the channel quality between the base station 12 and the UE 14. The communication interface 22 may also be used for data communication between the base station 12 and the UE 14.

To accommodate different performance requirements for uplink grant downlink control information (UL DCI) and downlink assignment DCI (DL DCI), two different outer-loop adjustments (a first adjustment for DL assignment DCIs and a second adjustment for UL grant DCIs) are provided. The two different outer-loop adjustments provide the flexibility to achieve different Block Error Rate (BLER) targets for the DL assignment and UL grant DCIs, respectively, and enables use of Physical Downlink Control Channel (PDCCH) resources more efficiently as compared to known methods.

Figure 2:
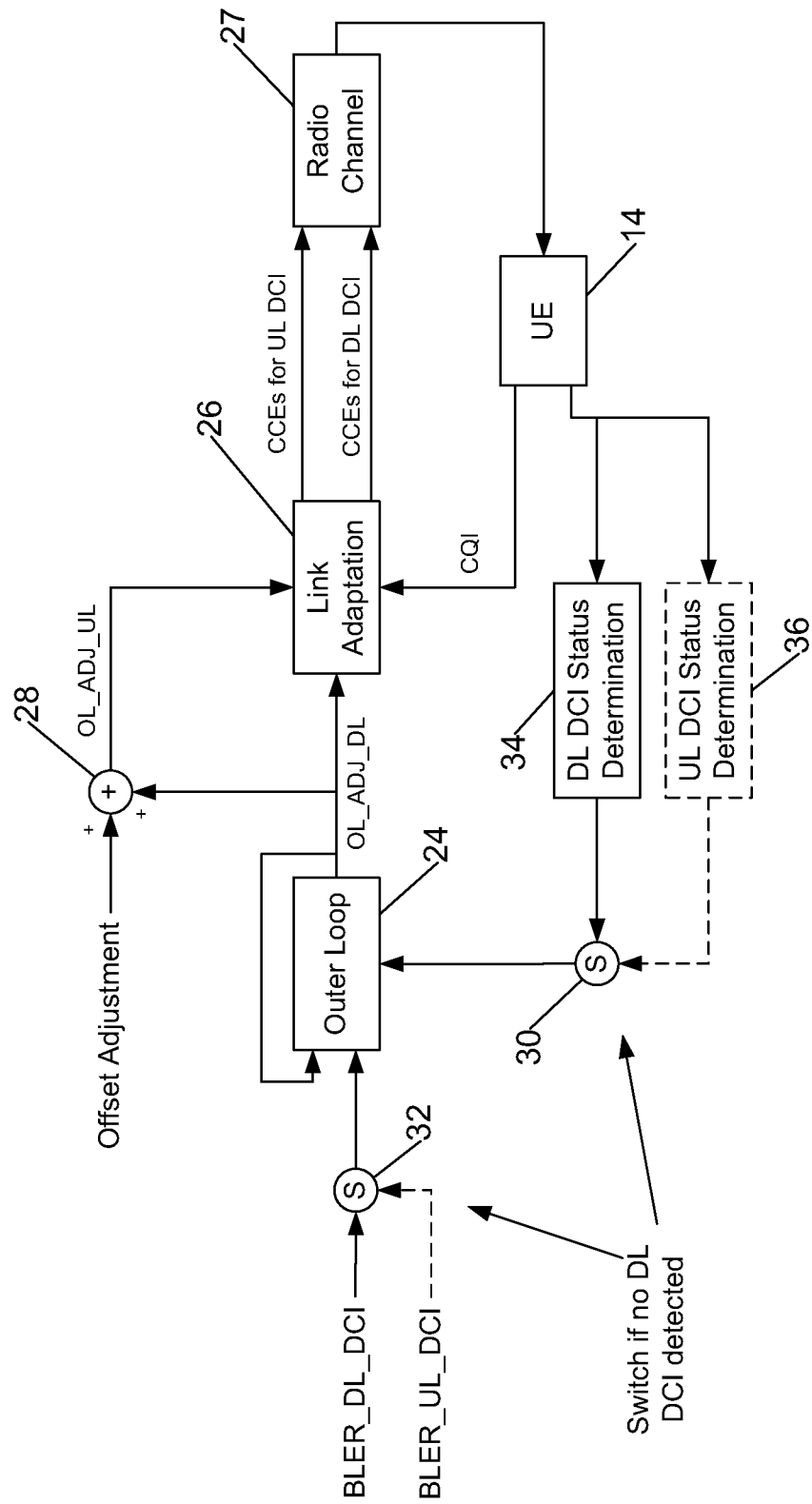
FIG. 2 is a block diagram of an exemplary process for updating an outer-loop adjustment using one outer-loop adjustment module in accordance with principles of the present invention.

An exemplary block diagram of a process for performing an outer-loop adjustment using one outer-loop adjustment module in accordance with principles of the present invention is described with reference to FIG. 2. A single outer-loop adjustment module 24 is shown. The outer-loop adjustment module 24 outputs an outer-loop downlink adjustment value, OL_ADJ_DL, and inputs the value to a link adaptation module 26, which determines a Control Channel Element (CCE) aggregation level of the DL DCI on the radio channel 27. To determine the CCE aggregation level for the UL DCI, an additional Signal to Interference plus Noise Ratio (SINR) offset value, Offset_Adjustment, is added at adder 28 to the outer-loop downlink adjustment value, OL_ADJ_DL, to produce an outer-loop uplink adjustment value, OL_ADJ_UL.

It will be appreciated that if the Offset_Adjustment is a negative value, the UL Adj will always have a lower SINR value than that of DL Adj, resulting in potentially higher CCE aggregation level for UL DCI than that of DL DCI. It will be further appreciated that if the Offset_Adjustment is a positive value, the UL Adj will always have a higher SINR value than that of DL Adj, resulting in potentially lower CCE aggregation level for UL DCI than that of DL DCI. Consequently, if the Offset_Adjustment is a negative value, the UL grant DCI will achieve a lower BLER than DL DCI under the same conditions of a radio channel 27.

The single outer-loop adjustment module 24 is configured to accommodate when downlink data packet feedback is received for DL assignment DCIs and a data packet is received for UL grant DCIs; downlink data packet feedback is only received for DL assignment DCIs; or a data packet is only received for UL grant DCIs from the UE 14. As used herein, feedback refers to an acknowledgement (ACK) or non-acknowledgement (NACK). When responses for both DL assignment DCIs and UL grant DCIs are received or only DL assignment DCIs, the outer-loop will only utilize downlink data packet feedback with a DL up step, UP_STEP_DL, and DL down step, DOWN_STEP_DL. The DOWN_STEP_DL value is based on a desired outer-loop convergence speed and the UP_STEP_DL value is determined based on the target DL BLER, BLER_DL_DCI, according to the following formula:

BLER_DL_DCI=UP_STEP_DL/(UP_STEP_DL+
DOWN_STEP_DL). (Eq. 5)

In addition, the outer-loop adjustment module 24 updates the outer-loop downlink adjustment value, OL_ADJ_DL, based on the status of the downlink data packet feedback corresponding to the DL assignment DCI transmission whereby:

If DL DCI transmission status = SUCCESS, then
  OL_ADJ_DL += UP_STEP_DL;
else, if DL DCI transmission status = FAILURE, then
  OL_ADJ_DL −= DOWN_STEP_DL;
else, if DL DCI transmission status = UNKNOWN, then
  OL_ADJ_DL −= α * DOWN_STEP_DL.

It will be appreciated that the DL DCI transmission status is indirectly determined by the base station 12 through the determination of the status of its corresponding downlink data packet feedback reception (ACK/NACK). If, for a number, N, of consecutive Transmission Time Intervals (TTIs), there is no DCI corresponding to DL assignment DCIs and there is DCI corresponding to UL grant DCIs, then switches 30 and 32 select different input parameters of the outer-loop adjustment module 24 such that the status of a data packet corresponding to the UL grant DCIs received from the UE 14 is used to update the outer-loop using the UL up step, UP_STEP_UL, and UL down step, DOWN_STEP_UL. The DOWN_STEP_UL value is selected based on a desired outer-loop convergence speed and may be, according to an exemplary embodiment, the same value as DOWN_STEP_DL. The UP_STEP_UL is determined based on the target UL BLER, BLER_UL_DCI, according to the following formula:

BLER_UL_DCI=UP_STEP_UL/(UP_STEP_UL+
DOWN_STEP_UL). (Eq. 6)

The target UL BLER, BLER_UL_DCI, is related to the Offset_Adjustment; for a negative Offset_Adjustment, BLER_UL_DCI should be a lower value than BLER_DL_DCI. The outer-loop adjustment module 24 updates the outer-loop downlink adjustment value, OL_ADJ_DL, based on the status of the UL DCI transmission whereby:

If UL DCI transmission status = SUCCESS, then
  OL_ADJ_DL += β * UP_STEP_UL;
else, if UL DCI transmission status = FAILURE, then
  OL_ADJ_DL −= β * DOWN_STEP_UL;
else if UL DCI transmission status = UNKNOWN, then
  OL_ADJ_DL −= α * β * DOWN_STEP_UL.

It will be appreciated that the UL DCI transmission status is indirectly determined by the base station 12 through the determination of the status of its corresponding UL data packet reception. The adjustment parameters, α and β, are each values from 0 to 1. The closer the adjustment parameter, α, is to 1, the more that the UNKNOWN status is treated like a transmission failure. A value of 0 means that no action is taken. The closer the adjustment parameter, β, is to 1, the greater confidence there is that the channel condition changes apply to both DL DCI and UL DCI. β may be referred to herein as a confidence parameter.

Once the outer-loop downlink adjustment value, OL_ADJ_DL, is determined as described above, OL_ADJ_DL is added to the SINR, which is determined based on CQI received from the UE 14, to produce an adjusted SINR for the downlink DCI. The adjusted SINR is applied to the determination of the downlink DCI CCE aggregation level.

The outer-loop uplink adjustment value, OL_ADJ_UL, is determined by adding the Offset_Adjustment value to the outer-loop downlink adjustment value, OL_ADJ_DL, as:

OL_ADJ_UL=OL_ADJ_DL+Offset_Adjustment. (Eq. 7)

The outer-loop uplink adjustment value, OL_ADJ_UL, is then added to the SINR, which is determined based on CQI received from the UE 14, to produce an adjusted SINR for the uplink DCI. The Offset_Adjustment value may be a predetermined value based on simulation and/or field test results. According to some exemplary embodiments, the Offset_Adjustment may be dynamically determined and may vary based on a number of DL data packet feedback ACKs/NACKs that are transmitted with the UL data packet corresponding to the uplink grant on the same TTI through a Physical Uplink Shared Channel (PUSCH).

It will be appreciated that because the above-described method utilizes the status of the UL data packet corresponding to the UL grant DCI when there is no DL assignment DCI, the outer-loop convergence occurs faster than if the status of the UL data packet corresponding to the UL grant DCI were not utilized. It will be further appreciated that because the negative Offset_Adjustment value is used to determine the outer-loop uplink adjustment value, OL_ADJ_UL, which is used to determine the UL DCI's CCE aggregation level, the target UL BLER, BLER_UL_DCI, is expected to be lower than the target DL BLER, BLER_DL_DCI.

According to some exemplary embodiments, a DL DCI status determination module 34 and a UL DCI status determination module 36 may receive a downlink data packet feedback corresponding to a downlink assignment and a data packet corresponding to an uplink grant from UE 14, determine the corresponding status and communicate the status to the outer-loop adjustment module 24.

Figure 3:
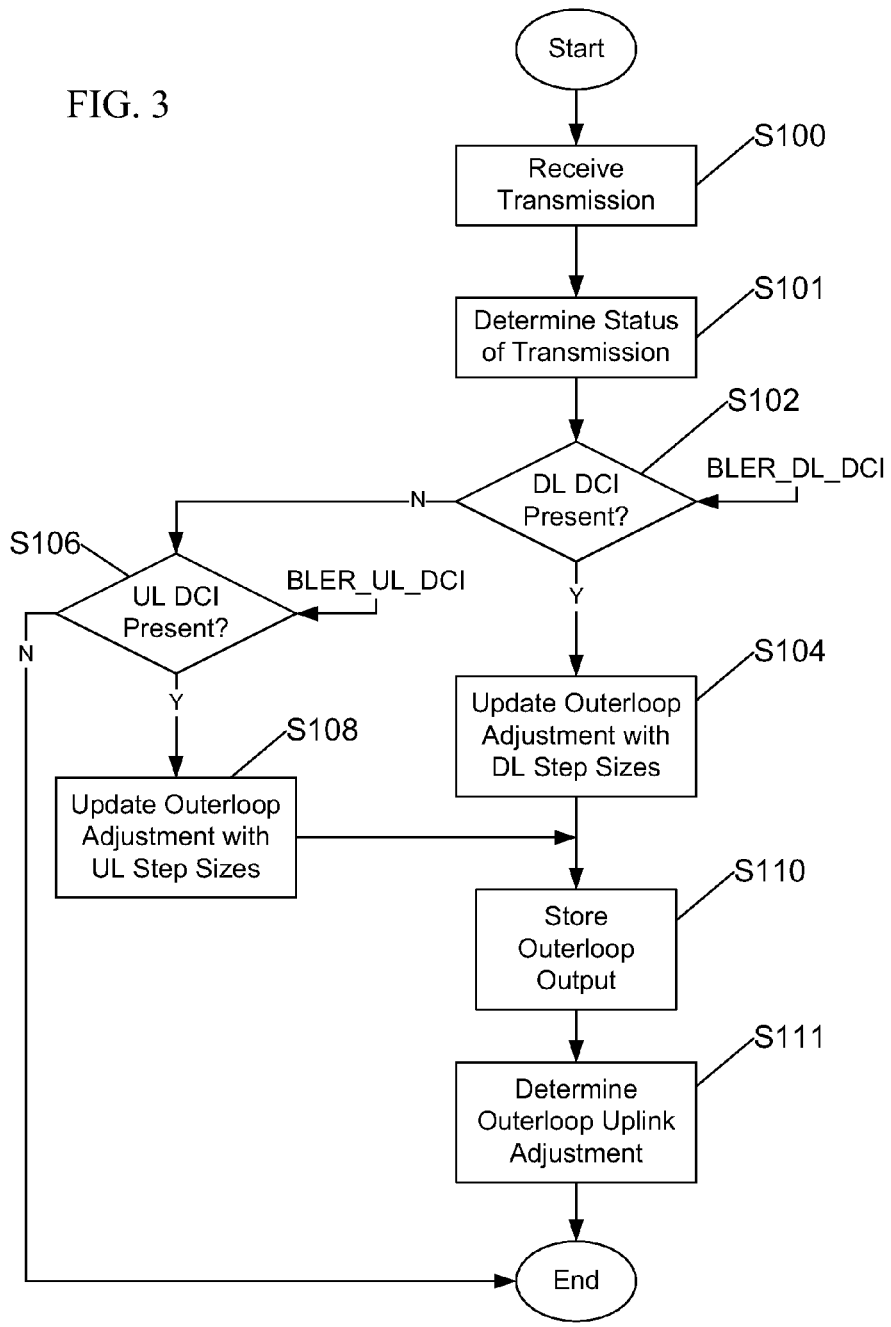
FIG. 3 is a flow chart of an exemplary process for updating an outer-loop adjustment step value in accordance with principles of the present invention.

A flow chart of a process for updating the outer-loop adjustment using one outer-loop adjustment module will be described with reference to FIG. 3. The outer-loop adjustment module 24 receives a downlink data packet feedback corresponding to a downlink assignment and a data packet corresponding to an uplink grant from the UE 14 (block S100) and determines a status of the received downlink data packet feedback or a data packet (block S101). The outer-loop adjustment module 24 determines whether it is the DL assignment DCI or a UL grant DCI (block S102). If the outer-loop adjustment module 24 determines that it is the DL DCI, the outer-loop adjustment step values associated with BLER_DL_DCI are utilized to update the outer-loop adjustment value (block S104), e.g., the outer-loop downlink adjustment value, OL_ADJ_DL. If no DL DCI is present, the outer-loop adjustment module 24 determines whether it is the UL DCI (block S106). If it is UL DCI, the outer-loop adjustment step values associated with BLER_UL_DCI are used to update the outer-loop downlink adjustment value (block S108). The outer-loop adjustment module 24 stores the updated downlink outer-loop adjustment value (block S110). The outer-loop uplink adjustment value, OL_ADJ_UL, is determined as a sum of the outer-loop downlink adjustment value and an offset adjustment (block S111).

Figure 4:
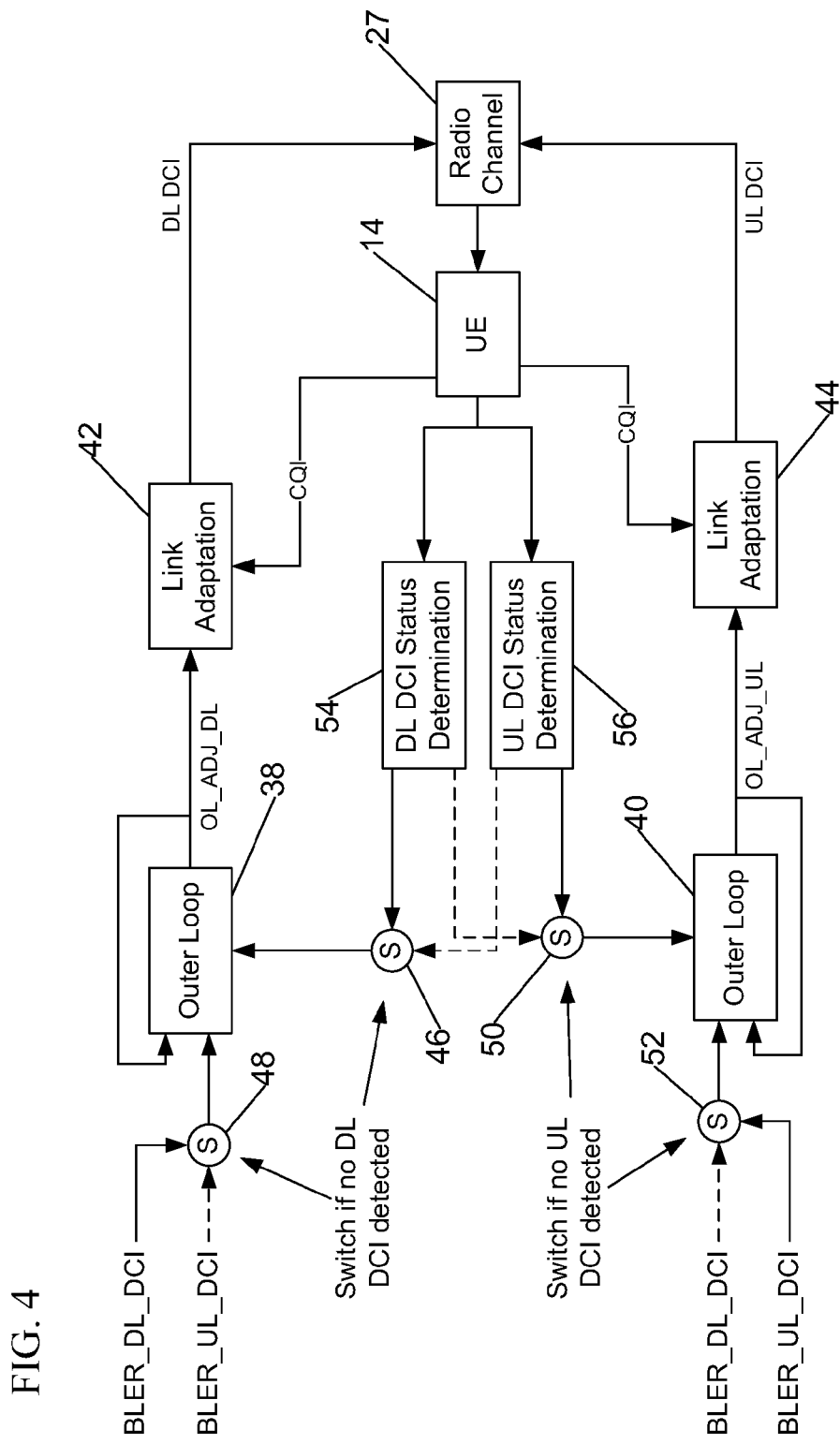
FIG. 4 is a block diagram of an exemplary process for updating an outer-loop adjustment using two outer-loop adjustment modules in accordance with principles of the present invention.

An exemplary block diagram of a process for performing an outer-loop adjustment using two outer-loop adjustment modules in accordance with principles of the present invention is described with reference to FIG. 4. The status of the downlink data packet feedback corresponding to the DL assignment DCI and status of the data packet corresponding to the UL grant DCI are tracked by two separate outer-loop adjustment modules 38 and 40, respectively. Using two outer-loop adjustment modules 38 and 40 achieves different target error rates for DL assignment DCIs and UL grant DCIs, respectively, and has the flexibility to adapt to possibly different channel conditions for DL and UL DCIs. Thus, each of the outer-loop adjustment modules 38 and 40 has an associated target BLER, BLER_DL_DCI and BLER_UL_DCI, respectively.

An outer-loop downlink adjustment value, OL_ADJ_DL, is output from the outer-loop adjustment module 38 and is input to a link adaptation module 42, which uses the outer-loop downlink adjustment value and the SINR determined from the CQI reported from the UE 14 to determine the CCE aggregation level of the DL DCI based on the radio channel 43. An outer-loop uplink adjustment value, OL_ADJ_UL, is output from the outer-loop adjustment module 40 and is input to a link adaptation module 44, which uses the outer-loop uplink adjustment value and the SINR determined from the CQI reported from the UE 14 to determine the CCE aggregation level of the UL DCI based on the radio channel 43.

The DL down step, DOWN_STEP_DL, and the UL down step, DOWN_STEP_UL, are selected based on the desired control loop convergence speeds. According to some exemplary embodiments, DOWN_STEP_UL may be the same value as DOWN_STEP_DL. The DL up step, UP_STEP_DL, and the UL up step, UP_STEP_UL, are then determined based on the target DL BLER, BLER_DL_DCI, and target UL BLER, BLER_UL_DCI, according to the following formula:

$$BLER\_DL\_DCI = UP\_STEP\_DL/(UP\_STEP\_DL + DOWN\_STEP\_DL); \text{ and} \quad (Eq. 8)$$

$$BLER\_UL\_DCI = UP\_STEP\_UL/(UP\_STEP\_UL + DOWN\_STEP\_UL). \quad (Eq. 9)$$

Similar to the outer-loop adjustment module 24 described above, the outer-loop adjustment module 38 updates the outer-loop downlink adjustment value, OL_ADJ_DL, based on the status of the DL assignment DCI transmission whereby:

> If DL DCI transmission status = SUCCESS, then
>     OL_ADJ_DL += UP_STEP_DL;
> else, if DL DCI transmission status
>     OL_ADJ_DL −= DOWN_STEP_DL;
> else, if DL DCI transmission status = UNKNOWN, then
>     OL_ADJ_DL −= α * DOWN_STEP_DL.

As previously described, the DL DCI transmission status is indirectly determined by the base station 12 through the determination of the status of its corresponding downlink data packet feedback reception (ACK./NACK). As described above, the adjustment parameter, α, is a value from 0 to 1.

Also similar to the outer-loop adjustment module 24, if, for a number, N, of consecutive TTIs, there is no DL assignment DCIs and there are UL grant DCIs, then switches 46 and 48 change the input parameters of the outer-loop adjustment module 38 such that the DCI transmission status for the UL grant DCIs is used to update the outer-loop downlink adjustment value using the UL up step, UP_STEP_UL, and UL down step, DOWN_STEP_UL. The outer-loop adjustment module 38 updates the outer-loop downlink adjustment value, OL_ADJ_DL, based on the status of the UL DCI transmission whereby:

> If UL DCI transmission status = SUCCESS, then
>     OL_ADJ_DL += β * UP_STEP_UL;
> else, if UL DCI transmission status = FAILURE, then
>     OL_ADJ_DL −= β * DOWN_STEP_UL;
> else if UL DCI transmission status = UNKNOWN, then
>     OL_ADJ_DL −= α * β * DOWN_STEP_UL.

The adjustment parameters, α and β, are each values from 0 to 1 and are adjusted as described above.

The outer-loop adjustment module 40 updates the outer-loop uplink adjustment value, OL_ADJ_UL, based on the status of the UL grant DCI transmission whereby:

> If UL DCI transmission status = SUCCESS, then
>     OL_ADJ_UL += UP_STEP_UL;
> else, if UL DCI transmission status = FAILURE, then
>     OL_ADJ_UL −= DOWN_STEP_UL;
> else, if UL DCI transmission status = UNKNOWN, then
>     OL_ADJ_UL −= α * DOWN_STEP_UL.

Similar to the outer-loop adjustment module 38 above, if, for a number, M, of consecutive TTIs, there is no UL grant DCIs and there are DL assignment DCIs, then switches 50 and 52 change the input parameters of the outer-loop adjustment module 40 such that the transmission status of the DL assignment DCIs is used to update the outer-loop using the DL up step, UP_STEP_DL, and DL down step, DOWN_STEP_DL. The outer-loop adjustment module 40 updates the outer-loop uplink adjustment value, OL_ADJ_UL, based on the status of the DL DCI transmission whereby:

> If DL DCI transmission status = SUCCESS, then
>     OL_ADJ_UL += β * UP_STEP_DL;
> else, if DL DCI transmission status = FAILURE, then
>     OL_ADJ_UL −= β * DOWN_STEP_DL;
> else, if DL DCI transmission status = UNKNOWN, then
>     OL_ADJ_UL −= β * α * DOWN_STEP_DL.

According to some exemplary embodiments, a DL DCI status determination module 54 and a UL DCI status determination module 56 may receive the downlink data packet feedback corresponding to DL DCI and the data packet corresponding to UL DCI from UE 14, determine the corresponding status and communicate the status to the outer-loop adjustment modules 38 and 40.

Figure 5:
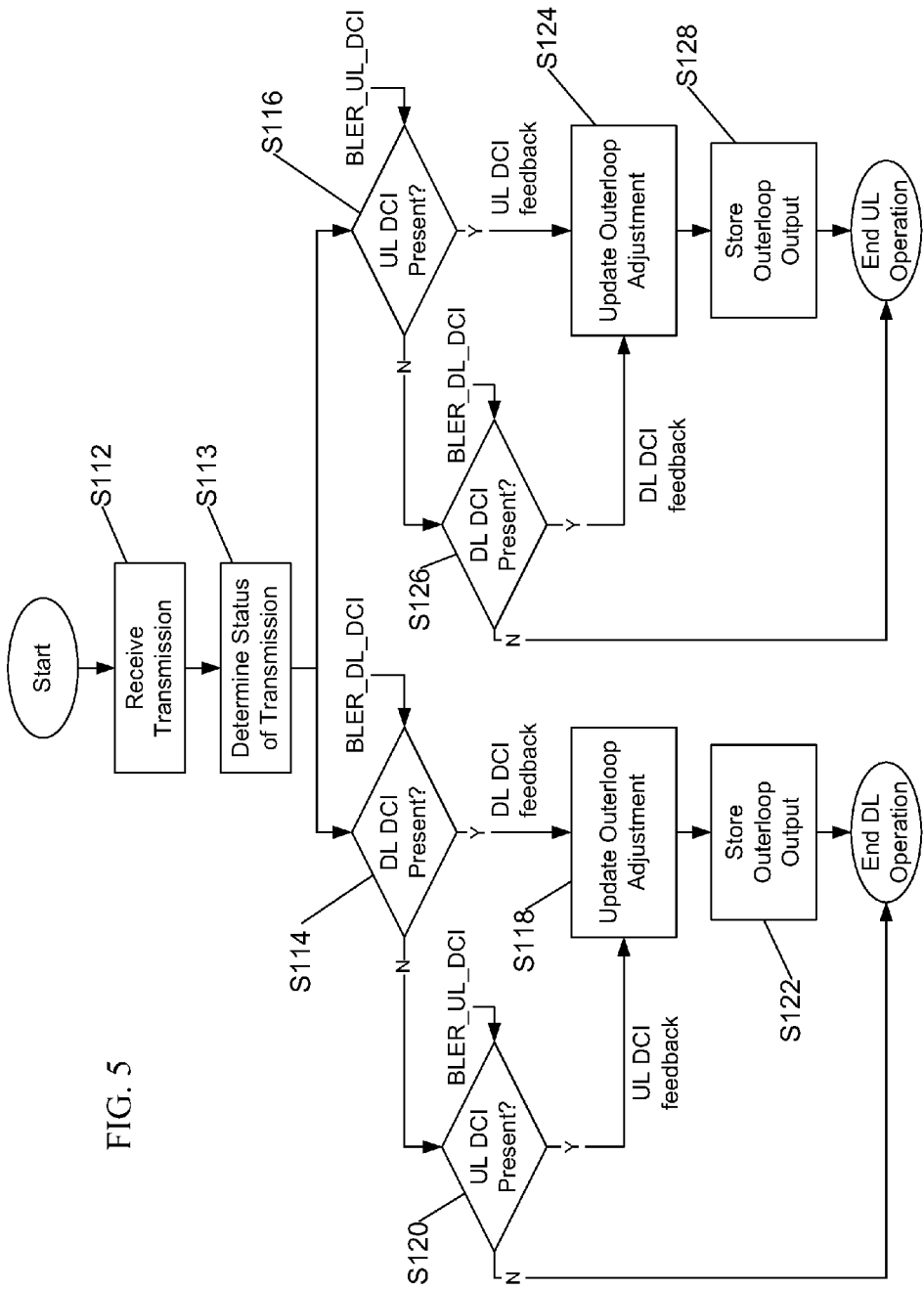
FIG. 5 is a flow chart of another exemplary process for updating an outer-loop adjustment value in accordance with principles of the present invention.

A flow chart of a process for updating the outer-loop adjustment using two outer-loop adjustment modules is described with reference to FIG. 5. The outer-loop adjustment modules 38 and 40 receive the downlink data packet feedback corresponding to the downlink assignment and the data packet corresponding to the uplink grant from the UE 14 (block S112). The outer-loop adjustment modules 38 and 40 determine a status of the downlink data packet feedback or the uplink data packet (block S113) and respectively determine whether it is DL DCI (block S114) and whether it is UL DCI (block S116).

If the outer-loop adjustment module 38 determines that it is DL DCI, the outer-loop adjustment module 38 updates the outer-loop downlink adjustment value (block S118) using the DL up step and DL down step values. If the outer-loop adjustment module 38 determines that it is UL DCI (block S120), the outer-loop adjustment module 38 updates the outer-loop downlink adjustment value (block S118) using the UL up step and UL down step values. The outer-loop adjustment module 38 stores the adjusted outer-loop downlink adjustment value in memory (block S122).

If the outer-loop adjustment module 40 determines that it is UL DCI, the outer-loop adjustment module 40 updates the outer-loop uplink adjustment value (block S124) using the UL up step and UL down step values. If the outer-loop adjustment module 40 determines that it is DL DCI (block S126), the outer-loop adjustment module 40 updates the outer-loop uplink adjustment value (block S124) using the DL up step and DL down step values. The outer-loop adjustment module 40 stores the adjusted outer-loop uplink adjustment value in memory (block S128).

Figure 6:
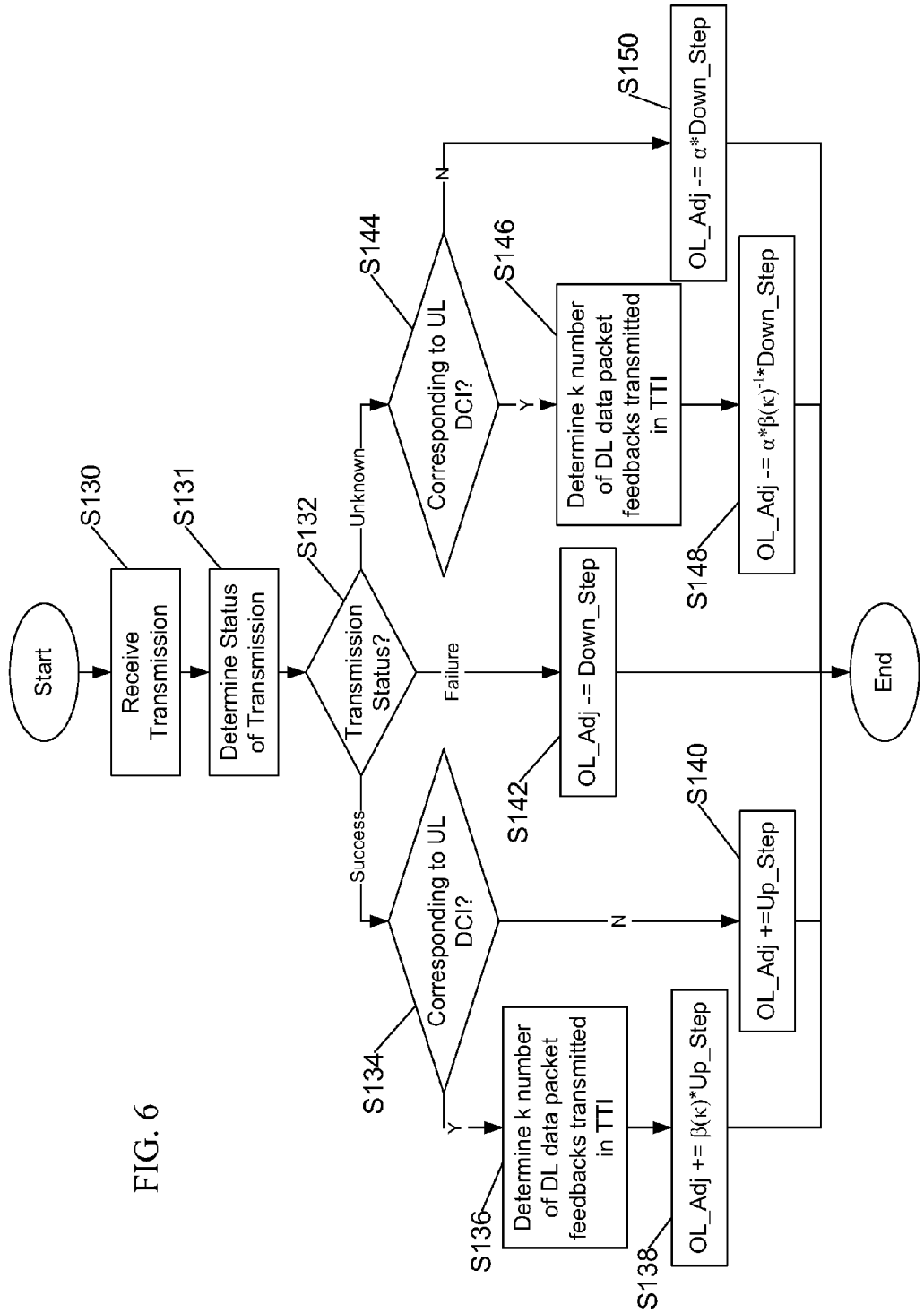
FIG. 6 is a flow chart of another exemplary process for updating an outer-loop adjustment value using one outer-loop adjustment module in accordance with principles of the present invention.

Referring now to FIG. 6, a flow chart of a process for updating the outer-loop adjustment using one outer-loop adjustment module is shown. It will be appreciated that the downlink data packet feedbacks corresponding to DL DCIs are sent on either PUCCH or PUSCH and the UL data packets corresponding to UL DCIs are sent on the PUSCH. If the downlink data packet feedback corresponding to DL DCIs and the UL data packet corresponding to UL DCIs are sent on the same TTI, both will be on the PUSCH. The outer-loop adjustment module receives either the downlink data packet feedback corresponding to DL DCIs on the PUCCH or the UL data packet corresponding to UL DCIs on the PUSCH or both on the PUSCH from the UE 14 (block S130) and determines their transmission statuses (block S131). The outer-loop adjustment module determines the transmission status of the downlink data packet feedback or the UL data packet as one of SUCCESS, FAILURE and UNKNOWN (block S132). If the status is SUCCESS, the outer-loop adjustment module determines whether the DCI is DL DCI or UL DCI (block S134).

If the DCI corresponds to a UL grant DCI, the outer-loop adjustment module determines a number, k, of the corresponding downlink data packet feedbacks transmitted in the same TTI on the PUSCH (block S136) and modifies the outer-loop adjustment value by the up step value factored by a function of k shown below (block S138):

$$OL\_ADJ\mathrel{+}=\beta(k)*UP\_STEP. \quad (Eq.\ 10)$$

If the DCI is DL assignment DCI, the outer-loop adjustment module modifies the outer-loop adjustment as shown below (block S140):

$$OL\_ADJ\mathrel{+}=UP\_STEP. \quad (Eq.\ 11)$$

If the status is FAILURE, the outer-loop adjustment module modifies the outer-loop adjustment as shown below (S142):

$$OL\_ADJ\mathrel{-}=DOWN\_STEP. \quad (Eq.\ 12)$$

If the status is UNKNOWN, the outer-loop adjustment module then determines whether the DCI corresponds to a UL grant DCI (block S144).

If the DCI transmission corresponds to a UL grant DCI, the outer-lop adjustment module determines a number, k, of the corresponding downlink data packet feedbacks transmitted in the same TTI on the PUSCH (block S146) and modifies the outer-loop adjustment value by the down step value factored by a factor α and an inverse function of k shown below (block S148):

$$OL\_ADJ\mathrel{-+}=\alpha*\beta(k)\mathrel{-}1*DOWN\_STEP. \quad (Eq.\ 13)$$

If the DCI transmission corresponds to the DL assignment DCI, the outer-loop adjustment module modifies the outer-loop adjustment as shown below (block S150):

$$OL\_ADJ\mathrel{-}=\alpha*DOWN\_STEP. \quad (Eq.\ 14)$$

Figure 7:
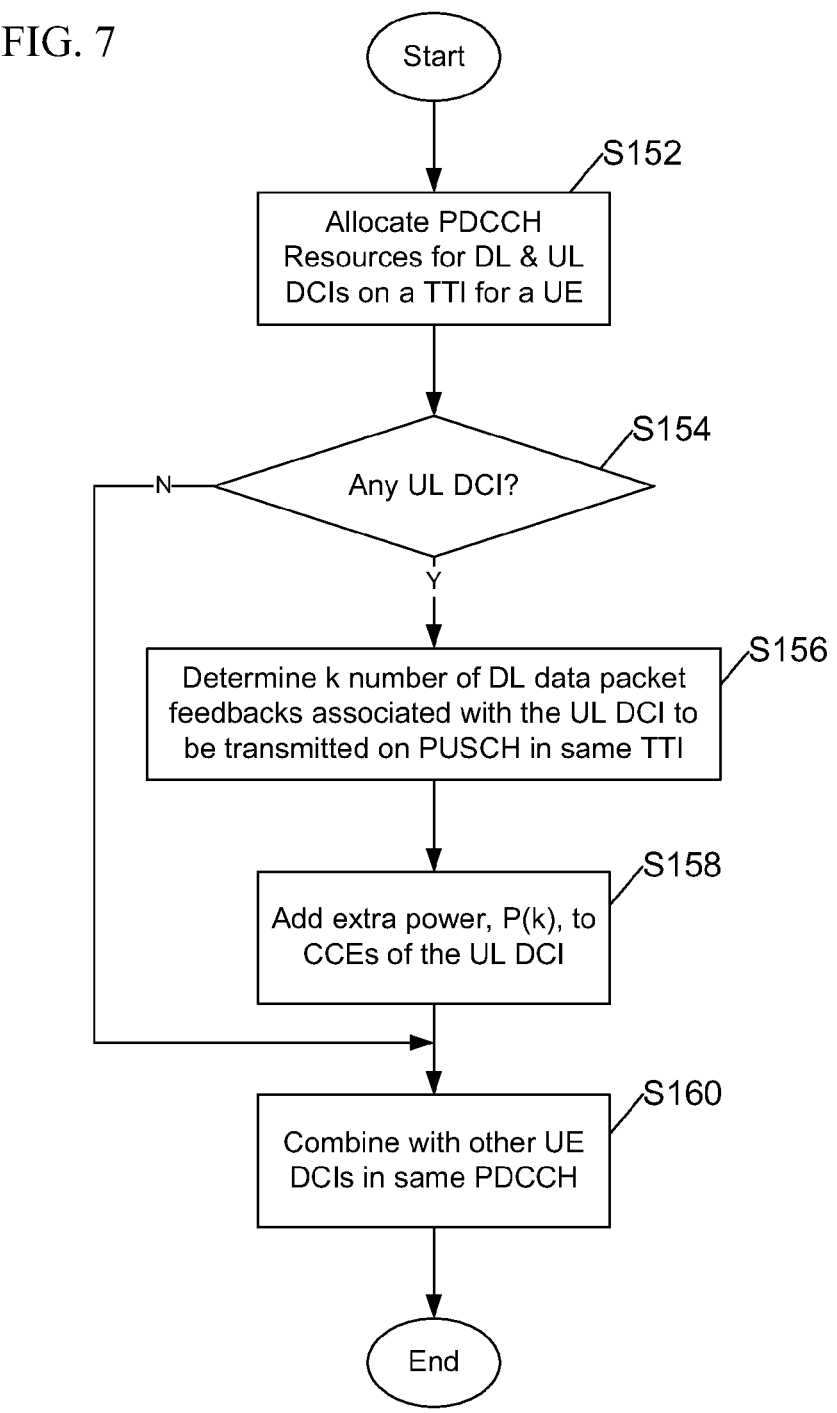
FIG. 7 is a flow chart of an exemplary process for adding power to Control Channel Elements (CCEs) of an Uplink Downlink Control Information (UL DCI) in accordance with principles of the present invention.

Referring now to FIG. 7, a flow chart of a process for adding power to transmission of CCEs of a UL DCI is shown. Initially, the base station 12 allocates PDCCH resources for DCIs in a TTI for sending to a UE 14 (block S152). The base station 12 determines whether there are any UL grant DCIs to be sent in the same TTI (block S154). If there are any UL grant DCIs, the base station 12 determines a number, k, of downlink data packet feedback messages that correspond to the DL assignment DCIs to be sent in the same UL TTI (block S156). It will be appreciated that the downlink data packet feedback corresponding to the DL assignment DCI and the UL data packet corresponding to UL grant DCI are received by the base station 12 in the same TTI on the PUSCH. The base station 12 adds extra power P(k) to the CCEs of the UL grant DCI (block S158). The base station 12 then combines the CCEs with the other UE DCIs in the same TTI on the PDCCH (block S160).

Figure 8:
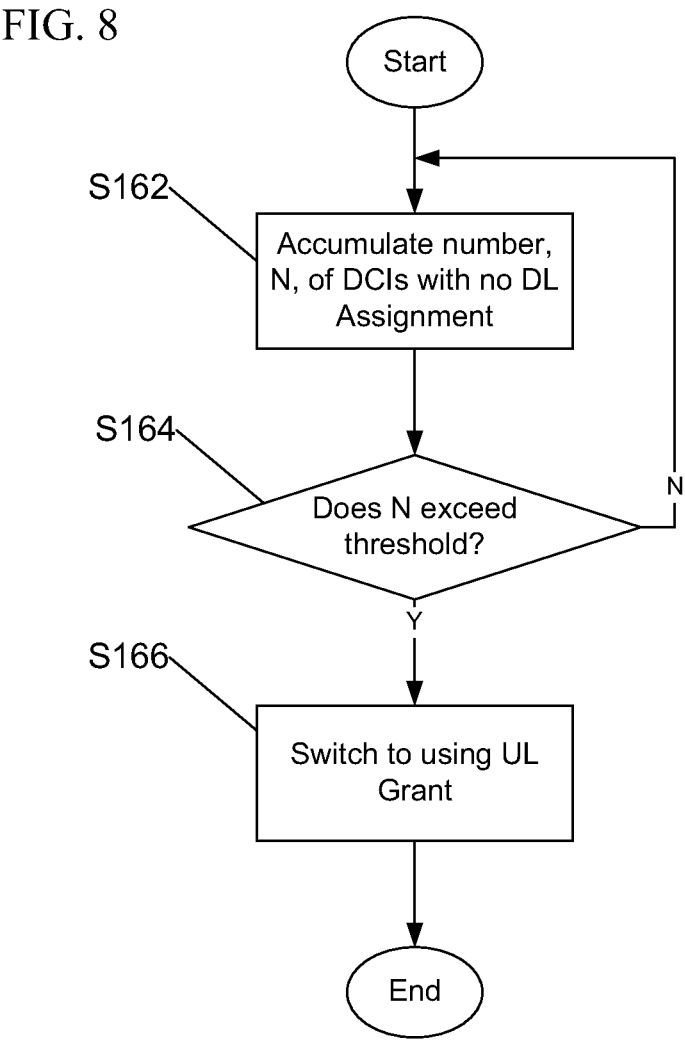
FIG. 8 is a flow chart of an exemplary process for switching from using the status of the downlink data packet feedback corresponding to a DL assignment DCI to using the status of the data packet corresponding to a UL grant DCI in accordance with principles of the present invention.

A flow chart of a process for determining when an outer-loop adjustment module that uses the status of the downlink data packet feedback corresponding to a DL assignment DCI should switch to using the status of the UL data packet corresponding to a UL grant DCI is described with reference to FIG. 8. The outer-loop adjustment module accumulates or tallies a number, N, of DCIs that correspond to a UL grant DCI (block S162). According to some exemplary embodiments, the accumulated number of DCIs is the number of consecutive DCIs that correspond to a UL grant DCI. The outer-loop adjustment module determines whether the accumulated number of DCIs exceeds a threshold value (block S164). If the threshold value is exceeded, the outer-loop adjustment module switches to using the status of the UL data packet corresponding to the UL grant DCI (block S166). It will be appreciated that the above process may also be utilized for switching from using the DL up step, UP_STEP_DL and DL down step, DOWN_STEP_DL, to using the UL up step, UP_STEP_UL, and UL down step, DOWN_STEP_UL when updating the outer-loop. It will be further appreciated that the above process may also be used when switching from using the status of the UL data packet corresponding to a UL grant DCI to using the status of the downlink data packet feedback corresponding to a DL assignment DCI. Moreover, the above process may be used for switching from using the UL up step and UL down step to using the DL up step and DL down step when updating the outer-loop.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of outer loop adjustment for link adaptation of a physical downlink control channel, PDCCH, in a communication network to determine a control channel element, CCE, aggregation level of a downlink assignment downlink control information, DCI, and a CCE aggregation level of an uplink grant DCI, the method comprising:
   receiving a downlink data packet feedback corresponding to the downlink assignment;
   determining a status of the downlink data packet feedback;

receiving an uplink data packet corresponding to the uplink grant;

determining a status of the uplink data packet;

updating an outer loop downlink adjustment based on the status of the downlink data packet feedback corresponding to the downlink assignment and the status of the uplink data packet corresponding to the uplink grant; and determining an outer loop uplink adjustment as a sum of the outer loop downlink adjustment and an offset adjustment, the outer loop downlink adjustment and the outer loop uplink adjustment affecting the outer loop adjustment for link adaptation of the PDCCH.

2. The method of claim 1, further comprising:

tallying a number of consecutive transmission time intervals, TTIs, that include DCIs corresponding to the uplink grant; and if the number of consecutive TTIs exceeds a predetermined threshold, updating the outer loop downlink adjustment by an uplink adjustment step based on the status of the uplink data packet corresponding to the uplink grant.

3. The method of claim 1, further comprising:

if the DCI corresponds to the downlink assignment, updating the outer loop downlink adjustment by a downlink adjustment step; and if the DCI corresponds to the uplink grant, updating the outer loop downlink adjustment by an uplink adjustment step.

4. The method of claim 3, wherein:

the downlink adjustment step is one of an up-step of the downlink adjustment step and a down-step of the downlink adjustment step; and the uplink adjustment step is one of an up-step of the uplink adjustment step and a down-step of the uplink adjustment step.

5. The method of claim 4, further comprising:

determining, by a base station, the status of the downlink data packet feedback corresponding to the downlink assignment;

if the status of the downlink data packet feedback corresponding to the downlink assignment is unknown, factoring the down-step of the downlink adjustment step by an adjustment parameter; and using the factored down-step of the downlink adjustment step to update the outer loop downlink adjustment.

6. The method of claim 2, wherein updating the outer loop downlink adjustment by the uplink adjustment step includes factoring the uplink adjustment step by a confidence parameter.

7. The method of claim 6, further comprising:

if the status of the uplink data packet corresponding to the uplink grant is unknown, factoring a down-step of the uplink adjustment step by an adjustment parameter; and using the factored down-step of the uplink adjustment to update the outer loop downlink adjustment.

8. The method of claim 1, further comprising:

receiving a channel state information, CSI, reported from a user equipment, UE;

determining a signal to interference plus noise ratio, SINR, based on the CSI report;

determining the CCE aggregation level of the downlink assignment based on a sum of the determined SINR and the outer loop downlink adjustment;

determining the CCE aggregation level of the uplink grant based on a sum of the determined SINR and the outer loop uplink adjustment.

9. A method of dual outer loop adjustment having a first outer loop adjustment and a second outer loop adjustment for link adaptation of a control channel in a wireless communication network, the method comprising:

receiving a downlink data packet feedback corresponding to a downlink assignment downlink control information, DCI;

receiving an uplink data packet corresponding to an uplink grant DCI;

executing the first outer loop adjustment of a downlink adjustment to affect a first of the dual outer loop adjustment for link adaptation;

receiving a channel state information, CSI, reported from a user equipment, UE;

determining a signal to interference plus noise ratio, SINR, based on the CSI report; and determining a control channel element, CCE, aggregation level for the downlink assignment on the physical downlink control channel, PDCCH, based on a sum of the determined SINR and the downlink adjustment.

10. The method of claim 9, further comprising:

determining a CCE aggregation level for an uplink grant on the PDCCH based on a sum of the determined SINR and the updated uplink adjustment;

wherein executing the first outer loop adjustment of the downlink adjustment comprises:

if the DCI corresponds to the downlink assignment, updating the downlink adjustment, based on a status of the corresponding downlink data packet feedback, by a downlink adjustment step; and wherein executing the second outer loop adjustment of the uplink adjustment comprises;

if the DCI correspond to the uplink grant, updating the uplink adjustment, based on a status of the corresponding uplink data packet, by an uplink adjustment step.

11. The method of claim 10, further comprising:

determining, by a base station, the status of the downlink data packet feedback corresponding to the downlink assignment DCI, wherein executing the first outer loop adjustment of the outer loop downlink adjustment further comprises:

if the DCI corresponds to the downlink assignment and the status of the corresponding downlink data packet feedback is unknown, factoring a down step of the downlink adjustment step by an adjustment parameter; and using the factored down step of the downlink adjustment step to update the downlink adjustment; and determining, by the base station, the status of the uplink data packet corresponding to the uplink grant, wherein executing the second outer loop adjustment of the uplink adjustment further comprises:

if the DCI corresponds to the uplink grant and the status of the corresponding uplink data packet is unknown, factoring a down step of the uplink adjustment step by the adjustment parameter; and using the factored up step of the uplink adjustment step to update the uplink adjustment.

12. The method of claim 10, wherein executing the first outer loop adjustment of the downlink adjustment further comprises:

tallying a first number of consecutive DCI transmissions that correspond to the uplink grant;

if the first number exceeds a first predetermined threshold, determining whether the DCI transmission corresponds to the uplink grant;

if the DCI transmission corresponds to the uplink grant:
factoring the uplink adjustment step by a confidence parameter; and
using the factored uplink adjustment step to update the downlink adjustment.

13. The method of claim 12, wherein executing the second outer loop adjustment of the uplink adjustment further comprises:
tallying a second number of consecutive DCI transmissions that correspond to the downlink assignment;
if the second number exceeds a second predetermined threshold, determining whether the DCI transmission corresponds to the downlink assignment, the second predetermined threshold being different than the first predetermined threshold;
if the DCI transmission corresponds to the downlink assignment:
factoring the downlink adjustment step by the confidence parameter; and
using the factored downlink adjustment step to update the uplink adjustment.

14. The method of claim 10,
wherein executing the first outer loop adjustment of the downlink adjustment further comprises:
if the DCI transmission corresponds to the uplink grant, factoring the uplink adjustment step by a confidence parameter; and
using the factored uplink adjustment step to update the downlink adjustment; and
wherein executing the second outer loop adjustment of the uplink adjustment further comprises:
if the DCI transmission corresponds to the downlink assignment, factoring the downlink adjustment step by the confidence parameter; and
using the factored downlink adjustment step to update the uplink adjustment.

15. The method of claim 14,
wherein executing the first outer loop adjustment of the downlink adjustment further comprises:
if the DCI transmission corresponds to the uplink grant and the status of the corresponding uplink data packet is unknown, factoring a down step of the uplink adjustment step by the adjustment parameter and by the confidence parameter; and
using the factored down step of the uplink adjustment step to update the downlink adjustment; and
wherein executing the second outer loop adjustment of the uplink adjustment further comprises:
if the DCI transmission corresponds to the downlink assignment and the status of the corresponding downlink data packet feedback is unknown:
factoring a down step of the downlink adjustment step by the adjustment parameter and the confidence parameter; and
using the factored down step of the downlink adjustment step to update the uplink adjustment.

16. A method of outer loop adjustment for link adaptation of a physical downlink control channel, PDCCH, in a wireless communication network, the method comprising:
determining a number of downlink data packet feedbacks corresponding to downlink assignments to be received on a physical uplink shared channel, PUSCH, in a same transmission time interval, TTI, as an uplink data packet from a user equipment, UE, the uplink data packet corresponding to an uplink grant;
determining an additional transmission power for the uplink grant based on the number of downlink data packet feedbacks corresponding to downlink assignments to be transmitted with the corresponding uplink data packet in the same TTIs;
receiving the uplink data packet corresponding to the uplink grant;
determining a status of the uplink data packet;
receiving a downlink data packet feedback corresponding to a downlink assignment;
determining a status of the downlink data packet feedback; and
updating an outer loop adjustment based on the status of the downlink data packet feedback corresponding to the downlink assignment and the status of the uplink data packet corresponding to the uplink grant to affect outer loop adjustment.

17. The method of claim 16, wherein if the status of the downlink data packet feedback corresponding to the downlink assignment is success:
updating the outer loop adjustment by an up step;
if the status of the uplink data packet corresponding to the uplink grant is success:
determining a number of the downlink data packet feedbacks corresponding to downlink assignments transmitted on the PUSCH in the same TTI as the uplink data packet;
factoring the up step of the outer loop adjustment by an adjustment parameter based on the number of the downlink data packet feedback messages transmitted on the PUSCH in the same TTI; and
updating the outer loop adjustment by the factored up step.

18. The method of claim 17, wherein if the status of the downlink data packet feedback corresponding to the downlink assignment is unknown:
factoring a down step of the outer loop adjustment by a confidence factor; and
updating the outer loop adjustment by the factored down step.

19. The method of claim 16, wherein if the status of the uplink data packet is unknown:
determining a number of downlink data packet feedback messages transmitted on the PUSCH in the same TTI as the uplink data packet from the UE;
factoring a down step of the outer loop adjustment by an inverse of an adjustment parameter and a confidence factor depending on the number of downlink data packet feedbacks transmitted on the PUSCH in the same TTI;
updating the outer loop adjustment by the factored down step.

20. The method of claim 16, further comprising:
adding the additional transmission power to each control element of an uplink grant based on the number of the downlink data packet feedbacks corresponding to downlink assignments to be transmitted on the PUSCH in the same TTI as the corresponding uplink data packet.

21. A base station for communication with a mobile device for outer loop adjustment for link adaptation of a physical downlink control channel, PDCCH, in a communication network to determine a control channel element, CCE, aggregation level of a downlink assignment downlink control information, DCI, and a CCE aggregation level of an uplink grant DCI, the base station comprising:
a receiver configured to receive a downlink data packet feedback corresponding to the downlink assignment and an uplink data packet corresponding to the uplink grant from the mobile device;

a processor in communication with the receiver, the processor configured to:
  determine a status of each of the downlink data packet feedback corresponding to the downlink assignment and the uplink data packet corresponding to the uplink grant;
  update an outer loop downlink adjustment based on the status of the downlink data packet feedback corresponding to the downlink assignment and the status of the uplink data packet corresponding to the uplink grant; and
  determine an outer loop uplink adjustment as a sum of the outer loop downlink adjustment and an offset adjustment, the outer loop downlink adjustment and the outer loop uplink adjustment affecting the outer loop adjustment for link adaptation of the PDCCH.

22. The base station of claim 21, wherein the processor is further configured to:
  if the DCI transmission corresponds to the downlink assignment, update the outer loop downlink adjustment by a downlink adjustment step; and
  if the DCI transmission corresponds to the uplink grant, update the outer loop downlink adjustment by an uplink adjustment step.

23. The base station of claim 22, wherein the processor is further configured to:
  if the status of the downlink data packet feedback corresponding to the downlink assignment is unknown, factor the down-step of the downlink adjustment step by an adjustment parameter; and
  use the factored down-step of the downlink adjustment step to update the outer loop downlink adjustment.

24. The base station of claim 21, wherein:
the receiver is further configured to:
  receive a channel state information, CSI, reported from a user equipment, UE; and
the processor is further configured to:
  determine a signal to interference plus noise ratio, SINR, based on the CSI report;
  determine the CCE aggregation level of the downlink assignment based on a sum of the determined SINR and the outer loop downlink adjustment;
  determine the CCE aggregation level of the uplink grant based on a sum of the determined SINR and the outer loop uplink adjustment.

* * * * *

UNITED STATES PATENT AND TRADEMARK OFFICE
CERTIFICATE OF CORRECTION

PATENT NO. : 9,246,651 B2  
APPLICATION NO. : 14/106191  
DATED : January 26, 2016  
INVENTOR(S) : Guo et al.

Page 1 of 1

It is certified that error appears in the above-identified patent and that said Letters Patent is hereby corrected as shown below:

In the Specification

In Column 12, Line 51, delete "(block 5100)" and insert -- (block S100) --, therefor.

In the Claims

In Column 18, Line 12, in Claim 9, delete "adaptation;" and insert -- adaptation; executing the second outer loop adjustment of an uplink adjustment to affect a second of the dual outer loop adjustment for the link adaptation; --, therefor.

In Column 18, Line 32, in Claim 10, delete "comprises;" and insert -- comprises: --, therefor.

In Column 18, Line 33, in Claim 10, delete "correspond to" and insert -- corresponds to --, therefor.

Signed and Sealed this
Fourteenth Day of June, 2016

Michelle K. Lee
*Director of the United States Patent and Trademark Office*